United States Patent
Braun

(10) Patent No.: US 12,105,272 B2
(45) Date of Patent: Oct. 1, 2024

(54) MICROSCOPE SYSTEM AND METHOD FOR EXAMINING A SAMPLE

(71) Applicant: LEICA MICROSYSTEMS CMS GMBH, Wetzlar (DE)

(72) Inventor: Jan Braun, Gruenberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 677 days.

(21) Appl. No.: 17/291,283

(22) PCT Filed: Nov. 12, 2019

(86) PCT No.: PCT/EP2019/080926
§ 371 (c)(1),
(2) Date: May 5, 2021

(87) PCT Pub. No.: WO2020/099353
PCT Pub. Date: May 22, 2020

(65) Prior Publication Data
US 2022/0003981 A1 Jan. 6, 2022

(30) Foreign Application Priority Data
Nov. 12, 2018 (DE) .................. 10 2018 128 281.8

(51) Int. Cl.
*G02B 21/26* (2006.01)
*G02B 21/36* (2006.01)
(52) U.S. Cl.
CPC ........... *G02B 21/26* (2013.01); *G02B 21/365* (2013.01)
(58) Field of Classification Search
CPC .. G02B 21/26; G02B 21/365; G02B 21/0088; G02B 21/002; G02B 21/025;
(Continued)

(56) References Cited

U.S. PATENT DOCUMENTS 4,653,878 A * 3/1987 Nakasato ............... G02B 21/26
359/392
2006/0018013 A1 1/2006 Suzuki et al.
(Continued)

FOREIGN PATENT DOCUMENTS

DE 102012022603 B3 5/2014
EP 2196840 A1 6/2010
(Continued)

OTHER PUBLICATIONS

Examiner provided machine translation of Masahiro et al., JP 2008281720 (Year: 2008).*

*Primary Examiner* — Tuyen Tra
*Assistant Examiner* — Rahman Abdur
(74) *Attorney, Agent, or Firm* — LEYDIG, VOIT & MAYER, LTD.

(57) ABSTRACT

A microscope system for examining a sample includes: a microscope having a movable microscope table, on which the sample to be examined is positionable; and a controller for: transmitting a first position signal to the microscope table, based on which the microscope table is movable into a first table position; causing the microscope, in a first examination step, to examine a first region of the sample associated with the first table position when the microscope table has been moved into the first table position; transmitting at least one second position signal to the microscope table, based on which the microscope table is movable into a second table position; and causing the microscope, in a second examination step chronologically following the first examination step, to examine a second region of the sample associated with the second table position when the microscope table has been moved into the second table position.

9 Claims, 5 Drawing Sheets

(58) Field of Classification Search
CPC ...... G02B 21/06; G02B 21/16; G02B 21/248; G02B 21/361; G02B 21/36
USPC .......................................................... 359/391
See application file for complete search history.

(56) References Cited

U.S. PATENT DOCUMENTS

| | | |
|---|---|---|
| 2006/0077538 A1 | 4/2006 | Zahniser et al. |
| 2009/0195688 A1 | 8/2009 | Henderson et al. |
| 2010/0208052 A1 | 8/2010 | Sase |
| 2015/0317507 A1 | 11/2015 | Liebel et al. |
| 2018/0039059 A1 | 2/2018 | Kondo et al. |

FOREIGN PATENT DOCUMENTS

| | | |
|---|---|---|
| EP | 2256534 A1 | 12/2010 |
| EP | 3151053 A1 | 4/2017 |
| JP | 2005091893 A | 4/2005 |
| JP | 2008/281720 A | 11/2008 |
| JP | 2011141391 A | 7/2011 |

* cited by examiner

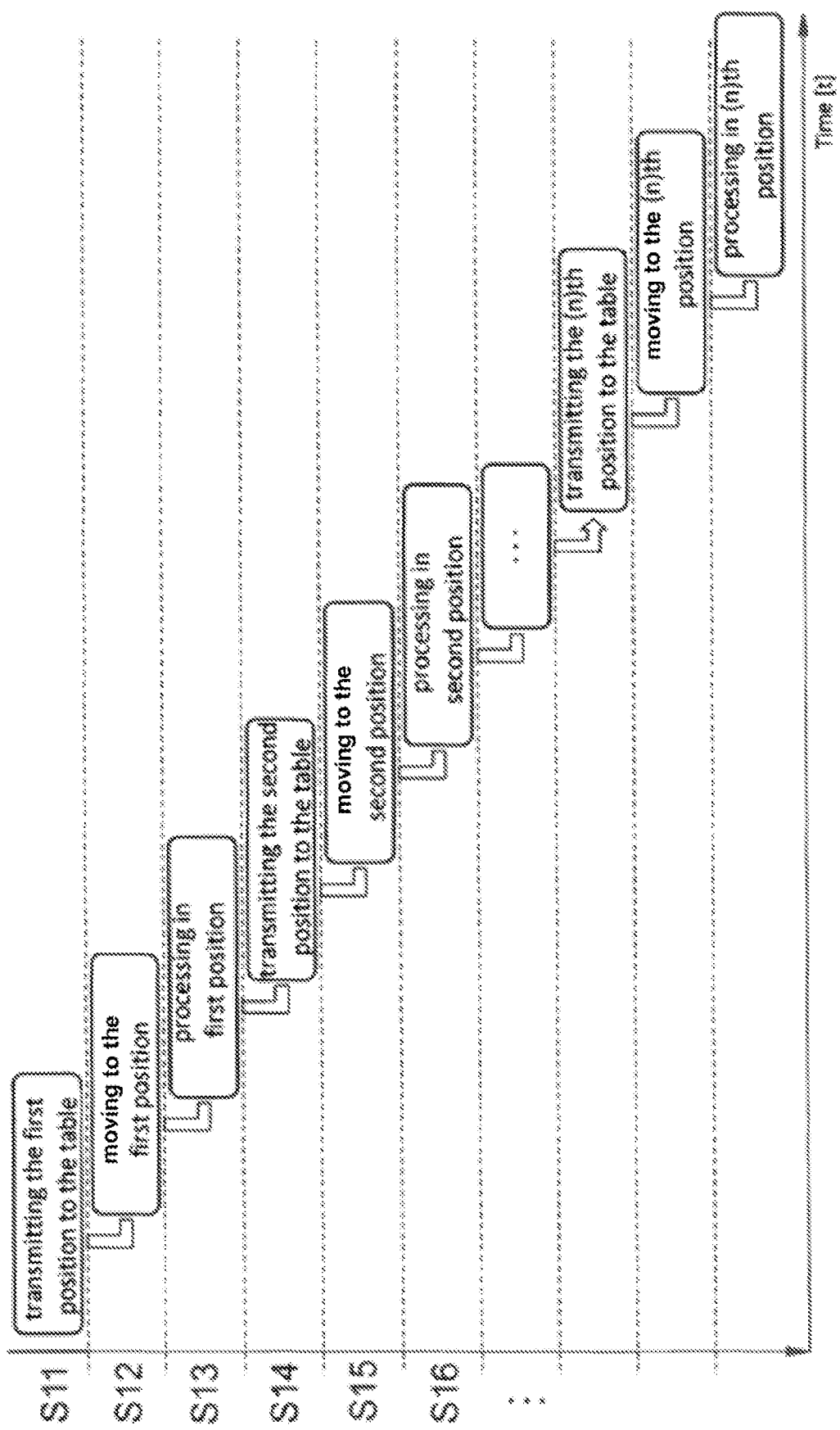

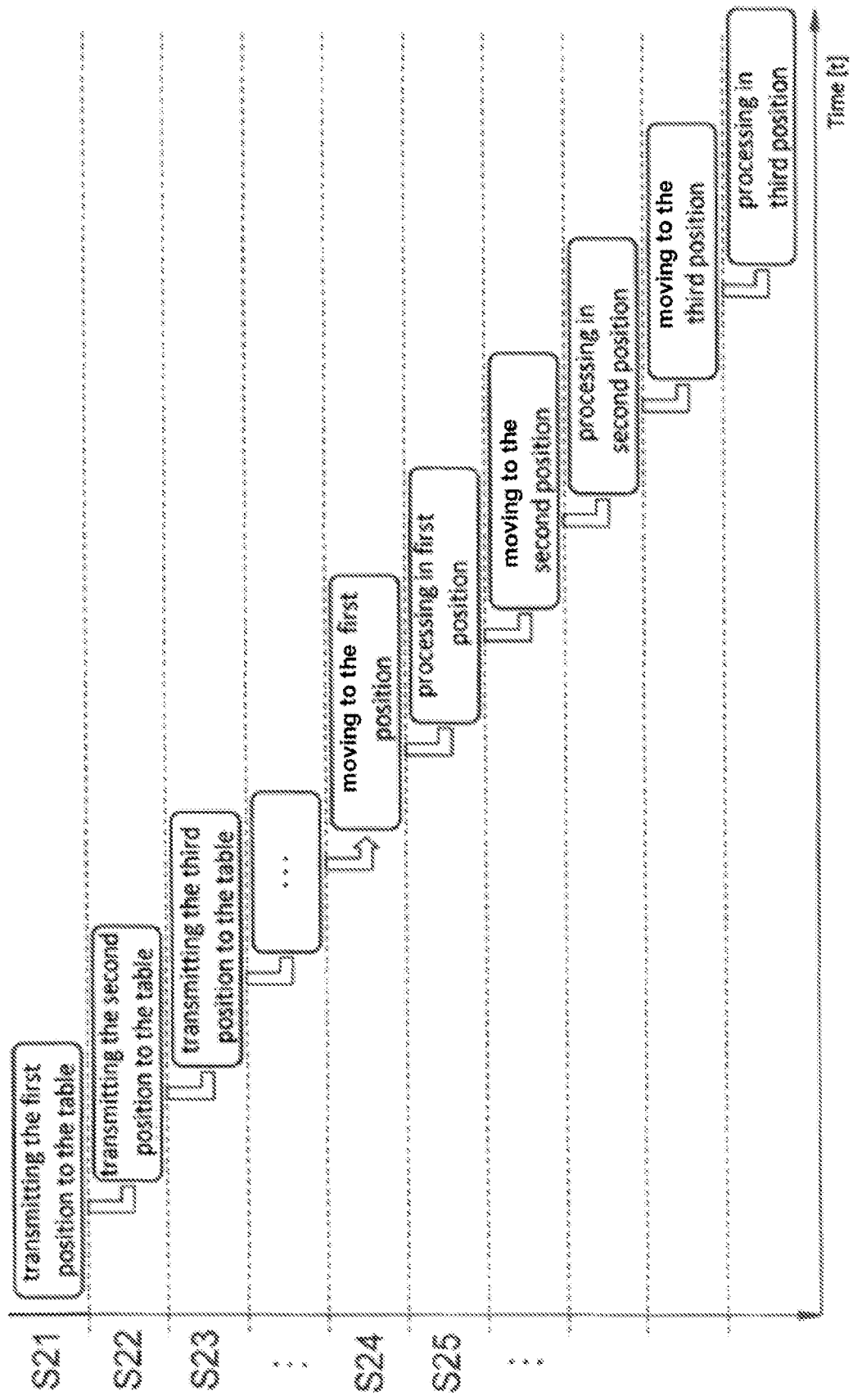

MICROSCOPE SYSTEM AND METHOD FOR EXAMINING A SAMPLE

CROSS-REFERENCE TO PRIOR APPLICATIONS

This application is a U.S. National Phase application under 35 U.S.C. § 371 of International Application No. PCT/EP2019/080926, filed on Nov. 12, 2019, and claims benefit to German Patent Application No. DE 10 2018 128 281.8, filed on Nov. 12, 2018. The International Application was published in German on May 22, 2020 as WO 2020/099353 under PCT Article 21(2).

FIELD

The invention relates to a microscope system for examining a sample, comprising a microscope having a movable microscope table, on which the sample to be examined is positionable, and a controller, which is designed to transmit a first position signal to the microscope table, on the basis of which the microscope table is movable into a first table position, to cause the microscope, in a first examination step, to examine a first region of the sample associated with the first table position when the microscope table has been moved into the first table position, to transmit at least one second position signal to the microscope table, on the basis of which the microscope table is movable into a second table position, and to cause the microscope, in a second examination step chronologically following the first examination step, to examine a second region of the sample associated with the second table position when the microscope has been moved into the second table position. The invention furthermore relates to a method for examining a sample by means of a microscope.

BACKGROUND

When carrying out light-microscopy experiments, it is often necessary to examine different sample regions by means of a microscope. For this purpose, it is necessary to position the sample in multiple steps relative to the microscope objective of the microscope. Movable microscope tables are often used for this purpose, on which the sample is arranged and which can be moved in a plane perpendicular to the optical axis of the objective. The microscope table can be moved manually or by a motor.

The circumstances of the experiment often require the movement of the microscope table to be automated, for example because a large number of sample regions has to be observed. Essentially two methods for automating the adjustment of the microscope table are known for this purpose from the prior art.

In a first known method, which is also referred to hereinafter as "sequential reloading", a position signal is transmitted to the microscope table in a first step. In a second step, the microscope table is moved into the desired table position on the basis of the position signal. In a third step, a sample region associated with the table position is examined. These steps are carried out in chronological succession, i.e. sequentially, for all sample regions to be examined. The disadvantage of this method is that the time required for transmitting the position signals is not used for the actual examination of the sample.

In a second known method, which is also referred to hereinafter as "preloading", all table positions to be moved to during the course of the experiment are transmitted in the form of position signals to the microscope table already at the beginning of the experiment. After all position signals have been transmitted, the microscope table is moved in succession into the table positions corresponding to the position signals, and the sample regions associated with the respective table positions are examined. The disadvantage of this method is, on the one hand, that the start of the experiment is delayed until all position signals have been transmitted. On the other hand, it is disadvantageous that an adaptation of the experiment with respect to the sample regions to be examined is no longer possible during the course of the experiment, since all position signals have already been transmitted before beginning the experiment.

SUMMARY

In an embodiment, the present invention provides a microscope system for examining a sample, comprising: a microscope having a movable microscope table, on which the sample to be examined is positionable; and a controller configured to: transmit a first position signal to the microscope table, based on which the microscope table is movable into a first table position; cause the microscope, in a first examination step, to examine a first region of the sample associated with the first table position when the microscope table has been moved into the first table position; transmit at least one second position signal to the microscope table, based on which the microscope table is movable into a second table position; cause the microscope, in a second examination step chronologically following the first examination step, to examine a second region of the sample associated with the second table position when the microscope table has been moved into the second table position; and transmit the second position signal to the microscope table while the microscope table is being moved into the first table position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 4 shows a schematic illustration of a conventional method as a comparative example; and FIG. 5 shows a schematic illustration of a further conventional method as a comparative example.

DETAILED DESCRIPTION

Figure 1:
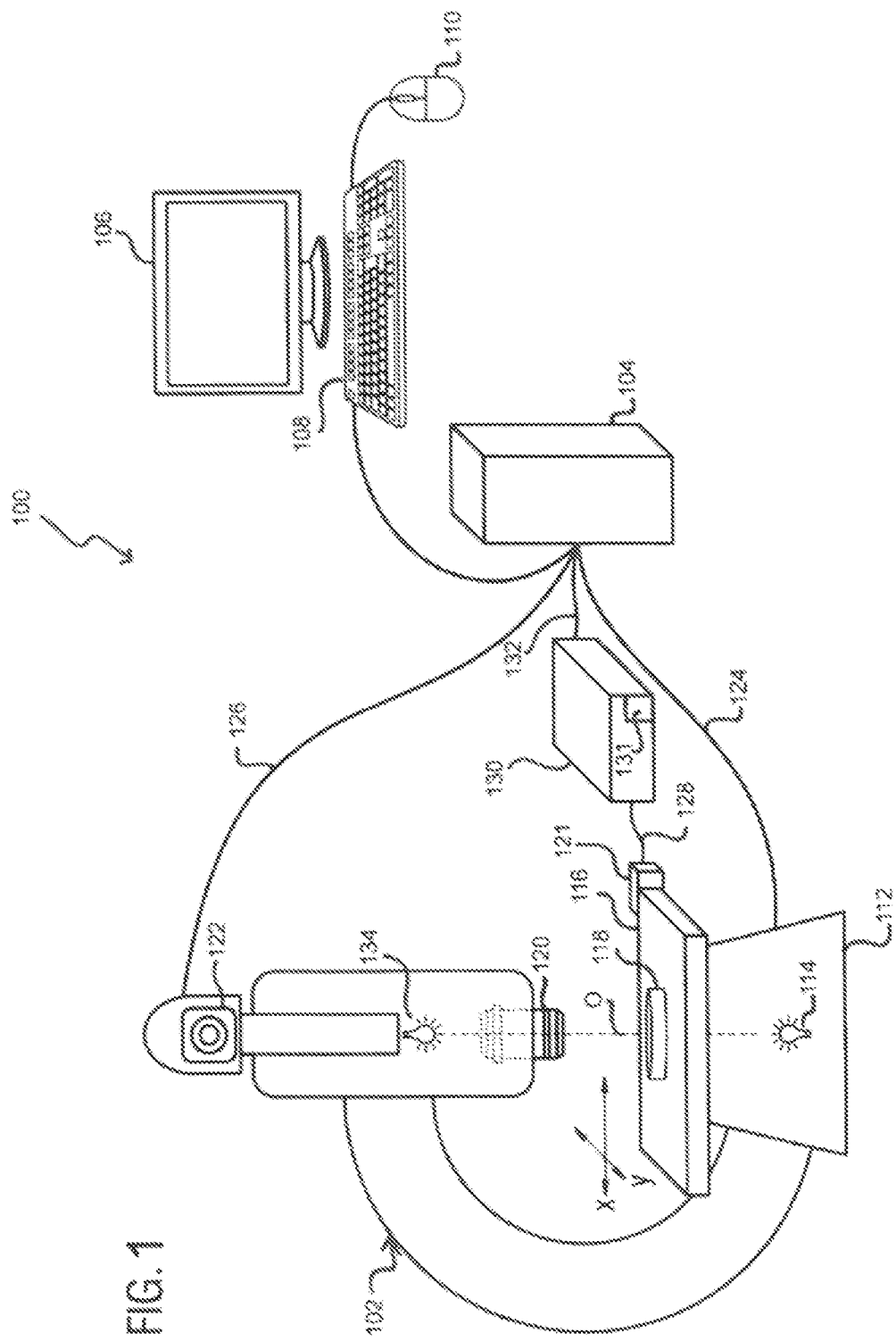
FIG. 1 shows a schematic illustration of a microscope system as an exemplary embodiment.

In an embodiment, the present invention provides a microscope system and a method for examining a sample which enable an adaptation of sample regions to be examined during the course of the experiment and also faster examination of the sample than previously.

The microscope system according to the invention for examining a sample comprises a microscope having a movable microscope table, on which the sample to be examined is positionable, and a controller. The controller is designed to transmit a first position signal to the microscope table, on the basis of which the microscope table is movable into a first table position; to cause the microscope, in a first examination step, to examine a first region of the sample associated with the first table position when the microscope table has been moved into the first table position; to transmit at least one second position signal to the microscope table, on the basis of which the microscope table is movable into a second table position; and to cause the microscope, in a second examination step chronologically following the first examination step, to examine a second region of the sample associated with the second table position when the microscope table has been moved into the second table position. The controller is furthermore designed to transmit the second position signal to the microscope table while the microscope table is being moved into the first table position.

Since the transmission of the position signals effected by the controller first takes place during the course of the experiment carried out using the microscope system, the sample regions to be examined are not yet finally established at the beginning of the experiment. In this way, for example, it is possible to react to dynamic processes in the sample to be examined and for the further course of the experiment to be adapted accordingly with respect to the positioning of the microscope table. The duration which is required to move the microscope table into the first table position is used according to the invention to send the second position signal to the microscope table. The microscope table can therefore be moved immediately, i.e. without any delay, into the second table position as soon as the first examination step has been completed. Therefore, no time is lost for the transmission of the position signals and the time saved can be used for the actual experiment. The microscope system according to the invention thus enables, in addition to a flexible adaptation of the sample regions to be examined during the course of the experiment, a faster light-microscopy examination than previously.

In the present description, a differentiation is to be made between the respective position signal, which the controller transmits to the microscope table at a given time and on the basis of which the microscope table is movable into the associated table position at a later time, and an activation or trigger signal, which actually triggers the desired table positioning by moving the microscope table at the above-mentioned later time.

A further advantage of the microscope system according to the invention is that the microscope table and/or the controller which controls the microscope operation only has to retain a small number of position signals in order to move the microscope table in the desired manner. High-performance memory elements can thus be omitted in the mentioned microscope components.

It is also possible for more than two sample regions to be examined using the microscope system according to the invention. For this purpose, a further position signal is transmitted by the control unit to the microscope table while the microscope table is being moved into a table position which is associated with a position signal preceding this further position signal. The microscope table is then moved on the basis of the further position signal into a table position which is in turn associated with a further sample region. This further sample region is then examined by means of the microscope in a further examination step chronologically following the second examination step. The above-mentioned steps are repeated until all desired sample regions have been microscopically examined.

The controller of the microscope system is preferably designed to generate a third position signal as a function of an examination result acquired by the microscope in the first examination step and to transmit this third position signal to the microscope table while the microscope table is being moved into the second table position, and to cause the microscope, in a third examination step chronologically following the second examination step, to examine a third region of the sample associated with the third table position when the microscope table has been moved into the third table position. This particularly advantageous refinement enables the experiment to be adapted flexibly to the results of the examination performed up to that point with respect to the selection of the table positions to be moved to by the microscope table and thus with respect to the sample regions to be examined, which are associated with these table positions.

It is advantageous if the microscope table is movable in a plane perpendicular to the optical axis of an objective of the microscope. In this way, as many regions of the sample as possible can be examined. Alternatively, the microscope table may be movable only along a direction perpendicular to the optical axis of the objective of the microscope.

In one advantageous refinement, the microscope comprises a detector which is designed to send examination results ascertained in the first examination step and/or in the second examination step to the controller. A selection of further sample regions to be examined can be carried out on the basis of these examination results. An automated examination of dynamic processes in the sample is enabled in this way.

The microscope table preferably includes a table drive and a table control unit, which is designed to receive the respective position signal transmitted by the controller and to activate the table drive on the basis of the received position signal to move the microscope table. As already explained above, a differentiation is to be made here between the position signal, which represents the table position to be set, and the activation or trigger signal, which triggers the actual adjustment of the microscope table. In the present embodiment, the table control unit sends such a trigger signal to the table drive in order to cause it to move the microscope table into the desired table position. The table drive is embodied, for example, as an electric motor and enables the microscope table to be moved in dependence on the provided position signals.

The microscope table preferably has a memory in which the respective position signal is storable. For the case in which the microscope table has a separate table controller, the above-mentioned memory is preferably part of the table controller. Alternatively or additionally, the controller of the microscope system can also include a memory for the position signals.

The microscope can be in particular a transmitted light microscope or an incident light microscope. The microscope can moreover be designed both as an upright microscope and also as an inverse microscope.

The invention furthermore relates to a method for examining a sample by means of a microscope, comprising the following steps: positioning the sample to be examined on a movable microscope table of the microscope; transmitting a first position signal to the microscope; moving the microscope on the basis of the first position signal into a first table position; causing the microscope, in a first examination step, to examine a first region of the sample associated with the first table position; transmitting at least one second position signal to the microscope table; moving the microscope table on the basis of the second position signal into a second table position; and causing the microscope, in a second examination step chronologically following the first examination step, to examine a second region of the sample associated with the second position of the microscope table. Furthermore, it is provided that the second position signal is transmitted to the microscope table while the microscope table is being moved into the first table position.

FIG. 1 shows a microscope system 100, which comprises an upright microscope 102 and a main control unit 104. The main control unit 104 is a personal computer, to which a monitor 106 and input devices in the form of a keyboard 108 and a mouse 110 are connected. The main control unit 104 has the function of controlling the overall operation of the microscope system 100.

Figure 2:
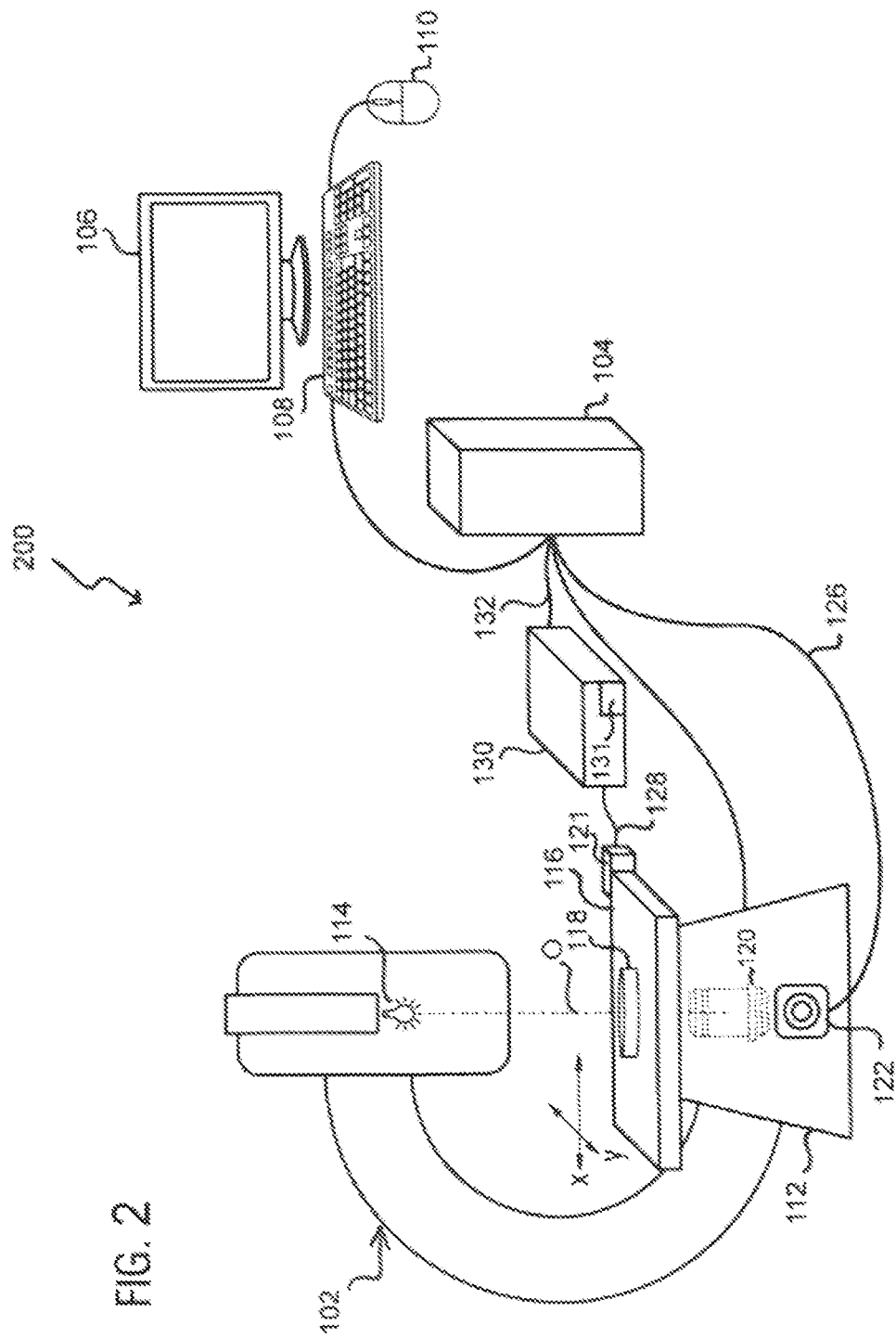
FIG. 2 shows a schematic illustration of a microscope system as a further exemplary embodiment.

The microscope 102 has a microscope stand 112 having an illumination unit 114. A microscope table 116, on which a sample 118 is arranged, is seated on the microscope stand 112. The microscope table 116 includes a table drive 121, which is embodied, for example, as an electric motor and has the function of moving the microscope table 116 in a plane, which is indicated in FIG. 2 by the two axes x and y. An objective 120, which images the sample 118 onto a detector 122, is located above the microscope table 116. The detector 122 is, for example, a CCD camera. As shown in FIG. 1, the plane in which the microscope table is movable by the table drive 121 is perpendicular to the optical axis 0 of the objective 120.

The microscope stand 112 and the detector 122 are connected via lines 124 and 126, respectively, to the main control unit 104. In contrast, the table drive 120 is connected via a line 128 to a table control unit 130, which is in turn coupled via a line 132 to the main control unit 104. The table control unit 130 has the function of controlling the table drive 121 so that the microscope drive 116 is moved in the desired manner.

In order to move the microscope table 116, the main control unit 104 transmits x-y position signals to the table control unit 130, which has an internal memory 131 which stores the transmitted position signals. The table control unit 130 then controls the table drive 121 on the basis of the stored position signals so that the microscope table 116 is moved into the desired table positions. The transmission of the position signals and the activation of the table drive 121 based thereon take place according to a time regime which will be explained later with reference to FIG. 3.

The main control unit 104 is also used in the exemplary embodiment shown in FIG. 1, in cooperation with the connected monitor 106 and/or the connected input devices 108, 110, as an input and output unit. For example, an operator can, via the keyboard 108 of the main control unit 104, specify table positions which the main control unit 105 transmits in the form of the position signals to the table controller 130 to activate the table drive 121. Furthermore, the operator can have examination results, which the detector 122 supplies in the present exemplary embodiment in the form of microscope images, displayed on the monitor 106.

The microscope 102 shown in FIG. 1 is designed as an upright transmitted light microscope. Accordingly, the illumination unit 114 is located below the microscope table 116 in FIG. 1. Alternatively, however, the microscope 102 can also be embodied as an incident light microscope. In such an embodiment, the illumination unit 114 is arranged above the microscope table 116, as indicated by the reference numeral 134 in FIG. 1.

FIG. 2 shows a schematic illustration of a microscope system 200 as a further exemplary embodiment.

The microscope system 200 shown in FIG. 2 differs from the microscope system 100 shown in FIG. 1 essentially in that the microscope 102 according to FIG. 2 is designed as an inverse transmitted light microscope. Accordingly, in the exemplary embodiment according to FIG. 2, the objective 120 and the detector 122 are arranged below the microscope table 116, while the illumination unit 114 is located above the microscope table 116. Identical or identically acting elements are identified by the same reference numerals in FIGS. 1 and 2.

Figure 3:
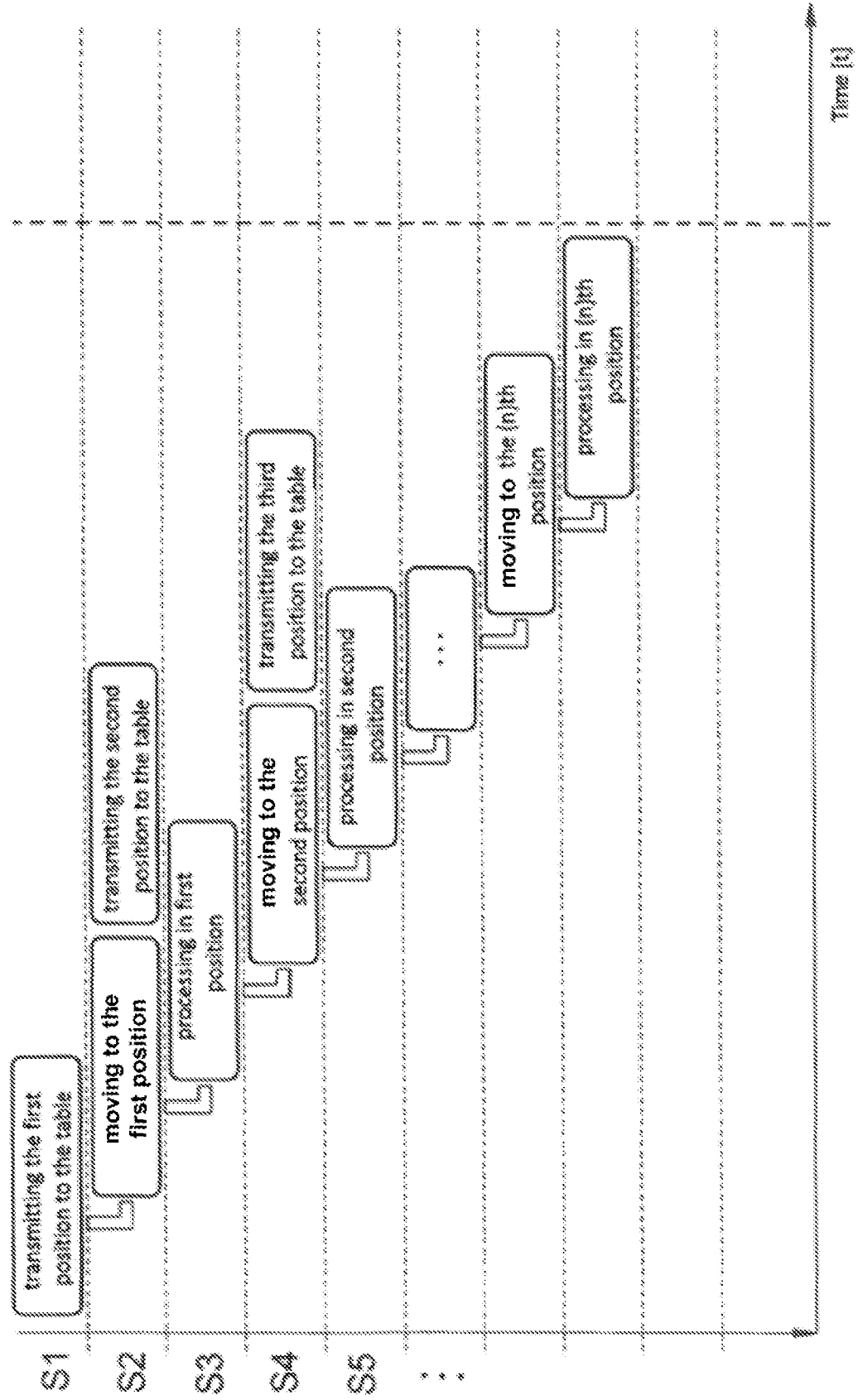
FIG. 3 shows a schematic illustration of a method for examining a sample using the microscope system according to FIGS. 1 and 2.

FIG. 3 shows a schematic illustration of a method which can be carried out using the microscope system 100 or 200 for the examination according to the invention of the sample 118.

In a first step S1, a first position signal is transmitted by the main control unit 104 to the table control unit 120 of the microscope table 116 and stored there in the internal memory 131.

In a second step S2, the table control unit 130 controls the table drive 121 of the microscope table 116, by sending out a trigger signal, in such a way that the latter is moved into a first table position associated with the first position signal. At the same time, the main control unit 104 transmits a second position signal to the table control unit 130, which the latter stores in its internal memory 131.

In a third step S3, a first region of the sample 118 associated with the first table position of the microscope table 116 is examined, in that in the present exemplary embodiment the detector 122 records an image of this sample region. This image is transmitted to the main control unit 104 and further processed therein. For example, the image is displayed on the monitor 106.

In a fourth step S4, the table control unit 130 controls the table drive 121 of the microscope table 116, by sending out a trigger signal, in such a way that it is moved into a second table position associated with the second position signal. At the same time, the main control unit 104 transmits a third position signal to the table control unit 130, which stores the third position signal in its internal memory 131.

In a fifth step S5, the detector 122 records an image of a second region of the sample 118 associated with the second table position, which is then in turn transmitted to the main control unit 104 and further processed therein.

In each of the following steps, a further position signal is transmitted by the main control unit 104 to the table control unit 130 and stored therein while the microscope table 116 is being moved into a position which is associated with a position signal preceding the respective further position signal. The microscope table 116 is, after transmission of the respective position signal, moved on the basis of a trigger signal into a further table position, which is associated with a further region of the sample to be examined. This further region is then examined using the detector 122 during the course of the imaging before a position signal is again transmitted by the main control unit 104. This is repeated until the examination of the sample 118 has been completed.

For comparison with the method according to the invention, the two methods mentioned at the outset, which are known from the prior art under the designations "sequential reloading" and "preloading", will also be explained below with reference to FIGS. 4 and 5.

In the method of sequential reloading according to FIG. 4, in a first step S11, a position signal is transmitted to the microscope table. In a second step S12 chronologically following the first step S11, the microscope table is then moved into a table position which corresponds to the previously transmitted position signal. In a third step S13 chronologically following the second step S12, a region of the sample associated with this table position is examined. The above-mentioned steps are repeated in succession for all sample regions to be examined.

In the method of preloading according to FIG. 5, all table positions are already supplied in succession in the form of corresponding position signals, which are to be moved to later by the microscope table, to the microscope table in a starting phase (steps S21 to S23), which precedes the actual examination of the sample. After all position signals have been transmitted in succession, the microscope table is subsequently, in step S24, moved into a first table position, which corresponds to the first of the previously transmitted table positions. Then, in step S25, a first sample region associated with the first table position is examined. Steps S24 and S25 are subsequently carried out in succession for all further table positions which have been transmitted in the starting phase.

The method of sequential reloading according to FIG. 4 has the disadvantage of, as it were, chronologically extending the experiment. In contrast, on the one hand, the method of preloading according to FIG. 5 has the disadvantage of the delayed start of the experiment. On the other hand, the preloading does not permit adaptation with respect to the table positions to be moved to in the experiment. Moreover, the available memory size of the table control unit 130 limits the experiment size, i.e., for example, the total number of table positions which can be moved to during the course of the experiment.

In contrast, the invention provides a solution which enables both particularly rapid sample examination and also flexible adaptation of the sample regions to be examined during the experiment and at the same time does not represent a limitation in the experiment size.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 microscope system
102 Microscope
104 main control unit
106 Monitor
108 Keyboard
110 Keyboard
112 microscope stand
112 detection device
114 illumination unit
116 microscope table
118 Sample
120 Objective
121 table drive
122 Detector
124, 126, 128 Lines
130 table controller
131 Memory
132 Line
134 illumination unit

The invention claimed is:

1. A microscope system for examining a sample, the microscope system comprising:
a microscope having a movable microscope table, on which the sample to be examined is positionable; and
a controller configured to:
transmit a first position signal to the microscope table, based on which the microscope table is movable into a first table position;
cause the microscope, in a first examination step, to examine a first region of the sample associated with the first table position when the microscope table has been moved into the first table position;
transmit at least one second position signal to the microscope table, while the microscope table is being moved into the first table position, wherein the microscope table is movable into a second table position based on the second position signal subsequent to the first examination step; and
cause the microscope, in a second examination step chronologically following the first examination step, to examine a second region of the sample associated with the second table position when the microscope table has been moved into the second table position.

2. The microscope system of claim 1, wherein the controller is configured to:
generate a third position signal as a function of an examination result acquired by the microscope in the first examination step and to transmit the third position signal to the microscope table while the microscope table is being moved into the second table position; and
cause the microscope, in a third examination step chronologically following the second examination step, to examine a third region of the sample associated with the third table position when the microscope has been moved into the third table position.

3. The microscope system of claim 1, wherein the microscope table is movable in a plane perpendicular to the optical axis of an objective of the microscope.

4. The microscope system of claim 1, wherein the microscope comprises a detector configured to send examination results ascertained in the first examination step and/or the second examination step to the controller.

5. The microscope system of claim 1, wherein the microscope table includes a table drive and a table control unit configured to receive a respective position signal transmitted by the controller and to activate the table drive based on the received position signal to move the microscope table.

6. The microscope system of claim 5, wherein the microscope table has a memory in which the respective position signal is storable.

7. The microscope system of claim 1, wherein the microscope comprises an incident light microscope or a transmitted light microscope.

8. The microscope system of claim 1, wherein the microscope comprises an upright microscope or an inverse microscope.

9. A method for examining a sample by a microscope, the method comprising:
- positioning the sample to be examined on a movable microscope table of the microscope;
- transmitting a first position signal to the microscope table;
- moving the microscope table based on the first position signal into a first table position;
- causing the microscope, in a first examination step, to examine a first region of the sample associated with the first table position;
- transmitting at least one second position signal to the microscope table, while the microscope table is being moved into the first table position;
- subsequent to first examination step, moving the microscope table based on the second position signal into a second table position; and
- causing the microscope, in a second examination step chronologically following the first examination step, to examine a second region of the sample associated with the second table position.

\* \* \* \* \*